United States Patent
Akamoto et al.

(10) Patent No.: US 9,822,888 B2
(45) Date of Patent: Nov. 21, 2017

(54) DIAPHRAGM VALVE

(71) Applicant: Kabushiki Kaisha Fujikin, Nishi-ku, Osaka-shi, Osaka (JP)

(72) Inventors: Hisatoshi Akamoto, Ikoma (JP); Izuru Shikata, Tsukuba (JP); Ryutaro Tanno, Tokyo (JP)

(73) Assignee: Kabushiki Kaisha Fujikin, Osaka (JP)

( * ) Notice: Subject to any disclaimer, the term of this patent is extended or adjusted under 35 U.S.C. 154(b) by 79 days.

(21) Appl. No.: 14/409,984

(22) PCT Filed: Sep. 6, 2013

(86) PCT No.: PCT/JP2013/074145
§ 371 (c)(1),
(2) Date: Dec. 19, 2014

(87) PCT Pub. No.: WO2014/050514
PCT Pub. Date: Apr. 3, 2014

(65) Prior Publication Data
US 2015/0144822 A1 May 28, 2015

(30) Foreign Application Priority Data

Sep. 27, 2012 (JP) ................................. 2012-215308

(51) Int. Cl.
*F16K 27/02* (2006.01)
*F16K 7/16* (2006.01)
(Continued)

(52) U.S. Cl.
CPC ................ *F16K 7/123* (2013.01); *F16K 7/16* (2013.01); *F16K 27/0236* (2013.01); *F16K 31/50* (2013.01)

(58) Field of Classification Search
CPC . F16K 7/123; F16K 31/50; F16K 7/16; F16K 27/0236
(Continued)

(56) References Cited

U.S. PATENT DOCUMENTS 3,257,097 A 6/1966 Boteler
3,743,245 A * 7/1973 Demler, Sr. ....... F16K 31/52491
251/251

(Continued)

FOREIGN PATENT DOCUMENTS

AU 74104/91 A 11/1991
DE 3447329 A1 7/1986
(Continued)

OTHER PUBLICATIONS

PCT Application Serial No. PCT/JP2013/074145, International Search Report dated Oct. 1, 2013.
(Continued)

*Primary Examiner* — Marina Tietjen
(74) *Attorney, Agent, or Firm* — Larry E. Henneman, Jr.; Gregory P. Gibson; Henneman & Associates, PLC

(57) ABSTRACT

A diaphragm valve includes a valve body, a diaphragm, a bonnet, an operation mechanism, and a fixing mechanism. The fixing mechanism includes a clamping member for integrally sandwiching and fixing, from both right and left sides, circumferential edges of both the bonnet and the valve body. A circular pressing member for pressing a circumferential edge of the diaphragm from above is interposed between the diaphragm and the bonnet and has convex portions and concave portions. The convex portions fit into notches provided at the circumferential edge of the diaphragm or the valve body, and the concave portions are fitted by protrusions provided at the circumferential edge of the diaphragm or the valve body.

9 Claims, 11 Drawing Sheets

(51) Int. Cl.
*F16K 31/50* (2006.01)
*F16K 7/12* (2006.01)

(58) Field of Classification Search
USPC .................. 251/331, 335.2, 45–46, 61–61.5
See application file for complete search history.

(56) References Cited

U.S. PATENT DOCUMENTS

| | | |
|---|---|---|
| 3,904,168 A | 9/1975 | Marocco |
| 5,288,052 A | 2/1994 | Black et al. |
| 6,416,038 B1 | 7/2002 | Sindel et al. |
| 8,794,595 B2 * | 8/2014 | Reed ................. F16K 7/126 137/552 |

FOREIGN PATENT DOCUMENTS

| | | |
|---|---|---|
| DE | 10146462 A1 | 4/2003 |
| DE | 69910497 T2 | 7/2004 |
| JP | 43-13908 | 6/1968 |
| JP | S56-62465 U | 5/1981 |
| JP | H11-210902 A | 8/1999 |
| JP | 2001-74151 A | 3/2001 |
| JP | 2007-278308 A | 10/2007 |
| JP | 2011-220415 A | 11/2011 |
| JP | 2011-226507 A | 11/2011 |
| JP | 2012-041979 A | 3/2012 |

OTHER PUBLICATIONS

PCT Application Serial No. PCT/JP2013/074145, Written Opinion dated Oct. 1, 2013.
PCT Application Serial No. PCT/JP2013/074145, International Preliminary Report on Patentability dated Mar. 31, 2015.
DE Application Serial No. 11 2013 002 449.7, Office Action dated Apr. 30, 2015 (English translation).
DE Application Serial No. 11 2013 002 449.7, Office Action dated Apr. 30, 2015 (Non-English document).
CN Application No. 201380019911.2, Office Action dated Dec. 3, 2015 (English translation).
KR Application No. 10-2014-7030930, Office Action dated Oct. 8, 2015 (English translation).
KR Application No. 10-2014-7030930, Office Action dated Jun. 28, 2016 (English translation).
CN Application No. 201380019911.2, Office Action dated Jul. 8, 2016 (with English translation).

* cited by examiner (a)

(b)

DIAPHRAGM VALVE

TECHNICAL FIELD

The present invention relates to a diaphragm valve, more particularly, a diaphragm valve which can be reduced in size and weight, can be easily assembled and disassembled, and enables the diaphragm to be accurately and easily positioned.

BACKGROUND OF THE INVENTION

As a fluid controller, a diaphragm valve is known, which comprises a valve body having a flow channel where fluid flows, a diaphragm which opens/closes the flow channel by abutting against and separating from the flow channel, a bonnet which sandwiches a circumferential edge of the diaphragm between the bonnet and the valve body, and an operation mechanism for moving up and down the diaphragm.

By way of an example of such traditional diaphragm valves, a diaphragm valve, for example, having structures shown in the following Patent Document 1 is known.

In this diaphragm valve, a circumferential edge (A) of a square diaphragm is sandwiched between a flange part (B) provided at an upper part of the valve body and a flange part (C) provided at a lower part of the bonnet and then fastened by a bolt (D) and a nut (E), so that the diaphragm, the bonnet, and the valve body are fixed, as shown in FIG. 11.

However, the diaphragm valve having such structures needs to be fastened and fixed with four bolts and nuts, and requires some time to be assembled and disassembled. Therefore, it has poor working efficiency with regard to manufacture and maintenance.

Furthermore, there is a problem that the diaphragm valve is required to increases its size and weight, since a flange part needs to be provided to sandwich the diaphragm between the valve body and the bonnet.

On the other hand, Patent Document 2 as shown below discloses a diaphragm valve having a clamp-type fixing structure for fixing a valve body and a bonnet using a clamping member.

However, the disclosed prior art has the problem as described below.

The disclosed prior art needs a circular diaphragm in a planar view, because it needs to use a clamp-type fixing structure. Therefore, the disclosed prior art has the problem that the diaphragm unfavorably rotates when assembling etc. and thus it can be hardly arranged at a given position (rotation angle) in an easy and accurate way. Especially, in case of exchanging diaphragms of valves attached to a place with poor workability (narrow space for manufacture lines etc.), it is difficult to accurately position and attach a diaphragm due to difficulty in visual confirmation.

PRIOR-ART DOCUMENTS

Patent Documents

Patent document 1: Tokukai2012-041979 Gazette
Patent document 2: Tokukoushsou43-13908 Gazette

Problems to be Solved by the Invention

The present invention aims to solve the problem of the conventional prior art described above and to provide a diaphragm valve which can be reduced in size and weight, can be easily assembled and disassembled, has good working efficiency with regard to manufacture and maintenance, and enables the diaphragm to be accurately and easily positioned.

Means for Solving the Problems

A diaphragm valve according to the invention includes a valve body having a flow channel where fluid flows, a diaphragm which opens/closes the flow channel by abutting against and separating from the flow channel, a bonnet which sandwiches a circumferential edge of the diaphragm between the bonnet and the valve body, an operation mechanism attached to the bonnet for moving the diaphragm up and down, and a fixing mechanism for fixing the bonnet and the valve body, wherein the fixing mechanism includes a clamping member for integrally sandwiching and fixing, from both right and left sides, circumferential edges of both the bonnet and the valve body, wherein a circular pressing member for pressing a circumferential edge of the diaphragm from above is interposed between the diaphragm and the bonnet, wherein the pressing member has convex portions and concave portions, wherein the convex portions fit into notches provided at the circumferential edge of the diaphragm or the valve body, and wherein the concave portions are fitted by protrusions provided at the circumferential edge of the diaphragm or the valve body.

In a particular embodiment, a lower surface of the diaphragm includes a projection sealing part which crosses the diaphragm through the center of the diaphragm, and wherein the notches or the protrusions of the diaphragm are formed at positions such that they are opposed to each other via the projection sealing part.

In an even more particular embodiment, the convex portions and the concave portions of the pressing member are provided at positions so as to be opposed to each other via the center of the pressing member, respectively, and, the convex portions and the concave portions are provided at different positions from each other in a circumferential direction.

In another particular embodiment, the circumferential edge of the diaphragm includes notches which the convex portions fit into and the circumferential edge of the valve body includes protrusions which fit into the concave portions.

In still another particular embodiment, the circumferential edge of the diaphragm includes protrusions which fit into the concave portions and the circumferential edge of the valve body includes notches which the convex portions fit into.

In yet another embodiment, an upper part of the valve body includes a receiving part which receives the diaphragm or the pressing member, wherein the receiving part is surrounded by a circular peripheral wall, and wherein the protrusions of the valve body are provided so as to protrude inwardly from the peripheral wall.

Effects of the Invention

According to the invention, no flange part is needed in order to sandwich a diaphragm between a valve body and a bonnet, and thus the valve body and the bonnet can be formed to have circular outer shape, and a diaphragm valve can be reduced in size and weight.

A fixing mechanism for fixing the bonnet and the valve body includes a clamping member for integrally sandwiching and fixing, from both right and left sides, circumferential edges of both the bonnet and the valve body. Therefore, the diaphragm valve can be easily assembled and disassembled, and also has good working efficiency with regard to manufacture and maintenance.

Furthermore, a circular pressing member for pressing a circumferential edge of the diaphragm from above is interposed between the diaphragm and the bonnet. The pressing member has convex portions and concave portions. The convex portions fit into notches provided at the circumferential edge of the diaphragm or the valve body, and the concave portions are fitted by protrusions provided at the circumferential edge of the diaphragm or the valve body. Therefore, it is possible to position the diaphragm with respect to the bonnet by attaching the diaphragm to the pressing member attached to the bonnet when assembling. It is also possible to position the pressing member with respect to the valve body when attaching to the valve body the bonnet with the diaphragm attached thereto. Therefore, even when it is difficult to visually confirm a position of the diaphragm, such as when exchanging diaphragms of valves attached to a place with poor workability, it is possible to accurately position and attach the diaphragm.

Also, according to the invention, a lower surface of the diaphragm includes a projection sealing part which crosses the diaphragm through the center of the diaphragm, and the notches or the protrusions of the diaphragm are formed at positions such that they are opposed to each other via the projection sealing part. Therefore, it is possible to arrange the projection sealing part in an accurate direction and to prevent deterioration in sealing function by providing the notches and the protrusions.

Furthermore, according to the invention, the convex portions and the concave portions of the pressing member are provided at positions so as to be opposed to each other via the center of the pressing member, respectively, and, the convex portions and the concave portions are provided at different positions from each other in a circumferential direction. Therefore, it is possible to accurately and easily position the diaphragm.

Additionally, according to one embodiment of the invention, the circumferential edge of the diaphragm includes notches which the convex portions fit into and the circumferential edge of the valve body includes protrusions which fit into the concave portions. Therefore, it is possible to accurately and easily position the pressing member and the diaphragm by fitting the convex portions of the pressing member into the notches of the diaphragm, and to accurately and easily position the pressing member and the valve body by fitting the protrusions of the valve body into the concave portions of the pressing member.

According to another embodiment of the invention, the circumferential edge of the diaphragm includes protrusions which fit into the concave portions and the circumferential edge of the valve body includes notches which the convex portions fit into. Therefore, it is possible to accurately and easily position the pressing member and the diaphragm by fitting the protrusions of the diaphragm into the concave portions of the pressing member, and to accurately and easily position the pressing member and the valve body by fitting the convex portions of the pressing member into the notches of the valve body.

Furthermore, according to the invention, an upper part of the valve body includes a receiving part which receives the diaphragm or the pressing member, the receiving part is surrounded by a circular peripheral wall, and the protrusions of the valve body are provided so as to protrude inwardly from the peripheral wall. Therefore, it is possible to accurately and easily attach to the bonnet the valve body with the diaphragm and the pressing member attached thereto.

DETAILED DESCRIPTION OF THE INVENTION

Hereinafter, preferred embodiments of the diaphragm valve according to the present invention will be set forth with reference to the drawings.

Figure 1:
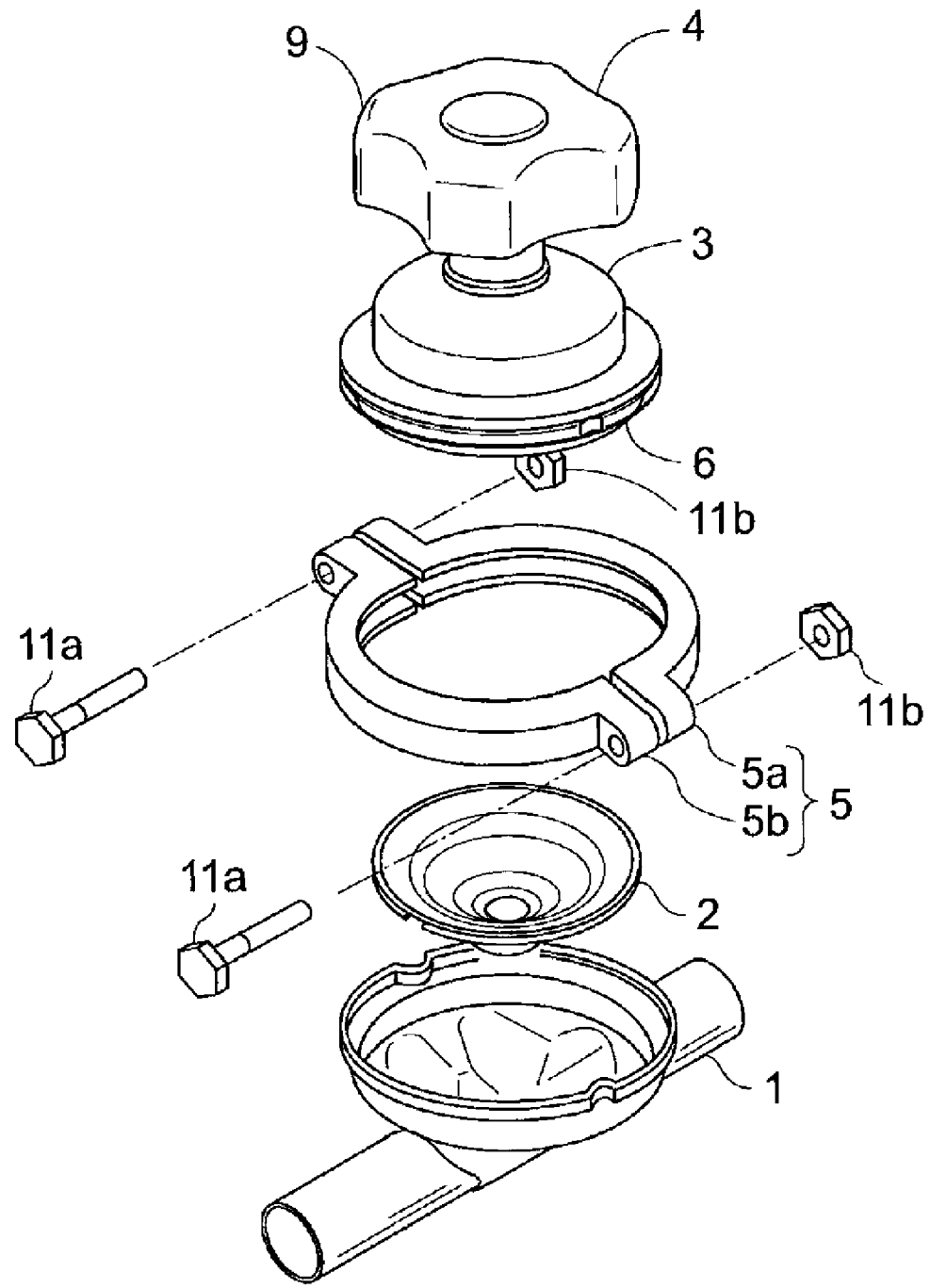
FIG. 1 It is an exploded perspective view of a diaphragm valve according to the present invention.

FIG. 1 is an exploded perspective view of the diaphragm valve according to the present invention. In this specification, upper direction refers to the upper direction in the FIG. 1, and lower direction refers to the lower direction in the FIG. 1.

The diaphragm valve according to the present invention comprises a valve body (1) having a flow channel where fluid flows, a diaphragm (2) which opens/closes the flow channel by abutting against and separating from the flow channel, a bonnet (3) which sandwiches a circumferential edge of the diaphragm (2) between the bonnet (3) and the valve body (1), an operation mechanism (4) attached to the bonnet (3) for moving up and down the diaphragm (2), a fixing mechanism (5) for fixing the bonnet (3) and the valve body (1), and a pressing member (6) for pressing a circumferential edge of the diaphragm (2) from above, which is interposed between the diaphragm (2) and the bonnet (3).

Figure 2:
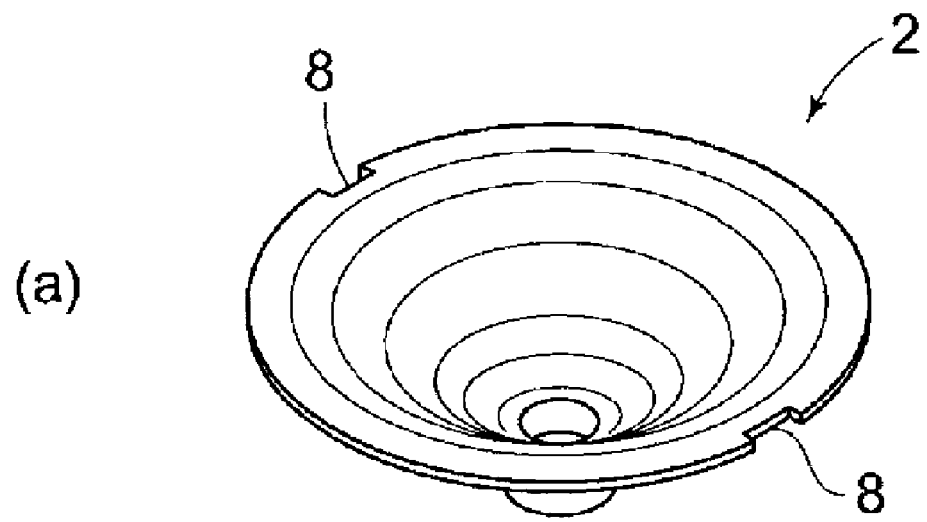
FIG. 2 It shows a diaphragm, and (a) is a top perspective view of the diaphragm, and (b) is a bottom perspective view of the diaphragm.
Figure 2:
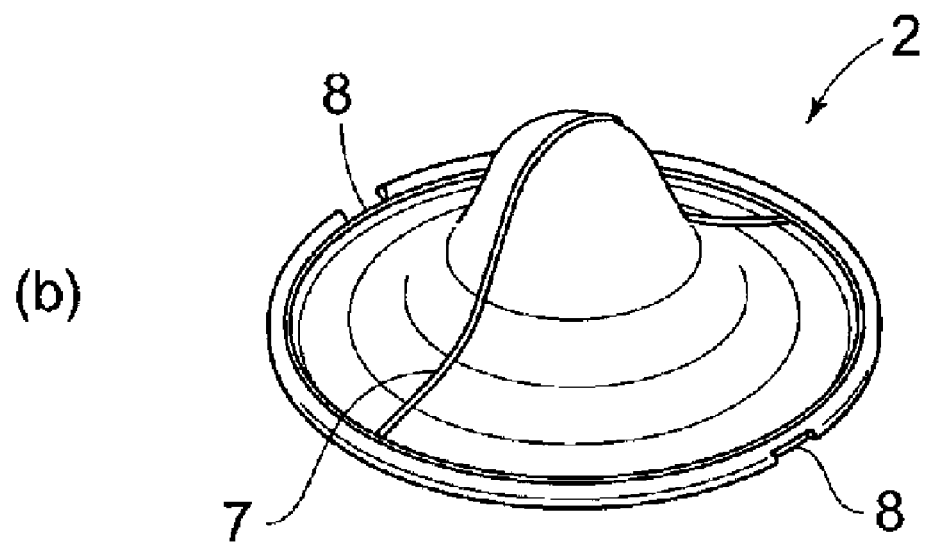

FIG. 2 shows the diaphragm (2), and (a) is a top perspective view of the diaphragm (2), and (b) is a bottom perspective view of the diaphragm (2). FIG. 2 shows the diaphragm (2) before transformation.

As a material for the diaphragm (2), a rubber material, such as, but not specifically limited to, crude rubber, nitrile rubber, styrene rubber, fluororubber (FPM), and ethylene propylene rubber (EPDM) etc., are preferably used in the present invention. The diaphragm (2) may be a single-layered diaphragm including the above-mentioned rubber materials, and may be a double-layered diaphragm on which a rubber membrane including the above-described rubber materials and a synthetic resin film, such as polytetrafluoroethylene resin (PTFE) etc., are laminated.

The diaphragm (2) is circular in a planar (top) view and is recessed downward from its circumferential edge to its center.

Lower surface of the diaphragm (2) includes a projection sealing part (7) which crosses the diaphragm (2) through the center of the diaphragm (2). This projection sealing part (7) is arranged at a right angle to a flow direction of a flow channel and plays a role in blocking circulation of fluid flowing in the flow channel by abutting against bottom surface of the flow channel.

The circumferential edge of the diaphragm (2) includes a pair (two) of notches (8) formed at a position such that they are opposed to each other via the projection sealing part (7). Specifically, the projection sealing part (7) and a straight line joining a pair of notches (8) are arranged at positions so as to meet at a right angle at the center of the diaphragm (at a position shifted by 90 degrees). No notch (8) is formed on an extension of the projection sealing part (7), and thus it is possible to prevent adverse effect such as deterioration in sealing function by providing the projection sealing part (7).

Convex portions (12) provided at the pressing member (6) discussed later fit into the notches (8), so that the diaphragm (2) is positioned with respect to the pressing member (6).

An operation mechanism (4) is a well-known mechanism including a stem which vertically extends and is coupled at its bottom end with the center of the diaphragm (2), a handle (9) attached to a top end of the stem, and a pressing body (a compressor) (10) attached to a bottom end of the stem (see FIG. 5 discussed below). The pressing body (10) and the diaphragm (2) are connected each other through a well-known coupling tool (a hanging fitting).

The handle (9) is rotated clockwise or counterclockwise so that the stem moves up and down. Accordingly, the diaphragm (2) abuts against or separates from the flow channel and then flow channel is opened or closed.

In the present invention, configuration of the operation mechanism (4) is not limited to this and may be, for example, a pneumatic mechanism for moving up and down the stem using a traditional well-known high pressure air.

A fixing mechanism (5) includes a clamping member for integrally sandwiching and fixing, from both right and left sides, circumferential edges of both the bonnet (3) and the valve body (1). Hereinafter, the fixing mechanism will be also referred to as a clamping member (5).

The clamping member (5) is composed of two members (5a) (5b), which are semicircular in a planar view (see FIG. 1), and has through holes at both ends of the two members which bolts are inserted into. The bolts (11a) are inserted into the through holes and fastened by nuts (11b), so that the two members are annularly integrated together.

The clamping member (5) has a U-shaped cross sectional shape. The circumferential edges of the bonnet (3) and the valve body (1) are fitted into the inside of the U-shaped part and then the bolts (11a) are screwed with nuts (11b). As a result, the bonnet (3) and the valve body (1) are integrally fixed by the clamping member (5).

Figure 3:
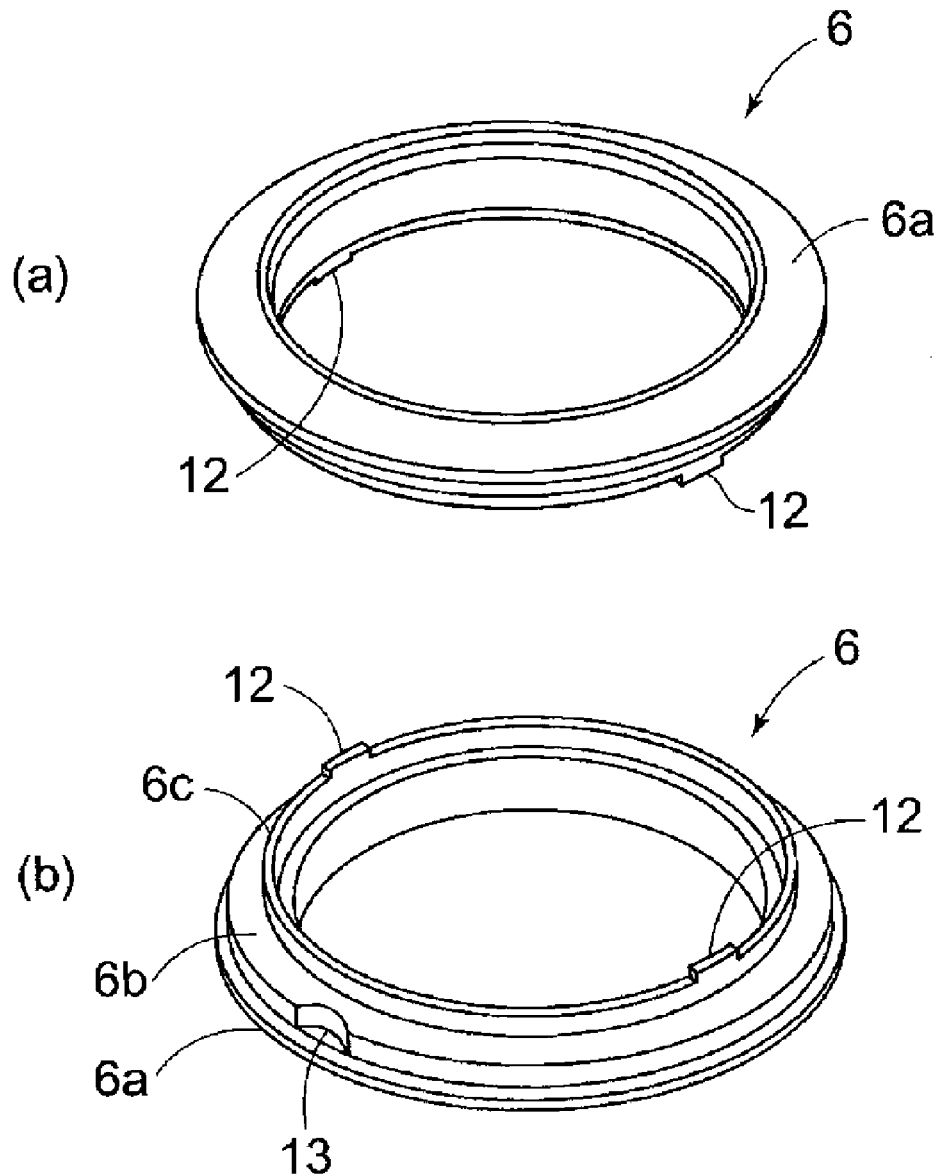
FIG. 3 It shows a pressing member, and (a) is a top perspective view of the pressing member, and (b) is a bottom perspective view of the pressing member.

FIG. 3 shows a pressing member (6). (a) is a top perspective view of the pressing member (6), and (b) is a bottom perspective view of the pressing member (6).

The pressing member (6) is circular in a planar view and comprises, from the top, an upper circular part (6a) having the largest outer diameter, a middle circular part (6b) having the outer diameter smaller than that of the upper circular part (6a), and a lower circular part (6c) having the outer diameter smaller than that of the middle circular part (6b), which are integrally formed.

The pressing member (6) has the convex portions (12) and the concave portions (13).

The convex portions (12) project downward from a lower end of the lower circular part (6c).

The concave portions (13) are recessed inward from a circumferential edge of the middle circular part (6b).

A pair of (two) convex portions (12) and a pair of (two) concave portions (13) are provided at positions so as to be opposed to each other via the center of the pressing member (6), respectively. These convex portions (12) and concave portions (13) are provided at different positions each other in a circumferential direction. Specifically, the convex portions (12) and the concave portions (13) are provided at positions such that a straight line joining a pair of convex portions (12) and a straight line joining a pair of concave portions (13) meet at a right angle at the center of the pressing member (6), i.e., at a position shifted by 90 degrees.

The pressing body (10) installed at the bottom end of the stem of the operation mechanism (4) attached to the bonnet (3) is engaged into the inside of the pressing member (6) (see FIG. 5 discussed below). This enables the pressing member (6) to be attached to the bonnet (3).

Figure 4:
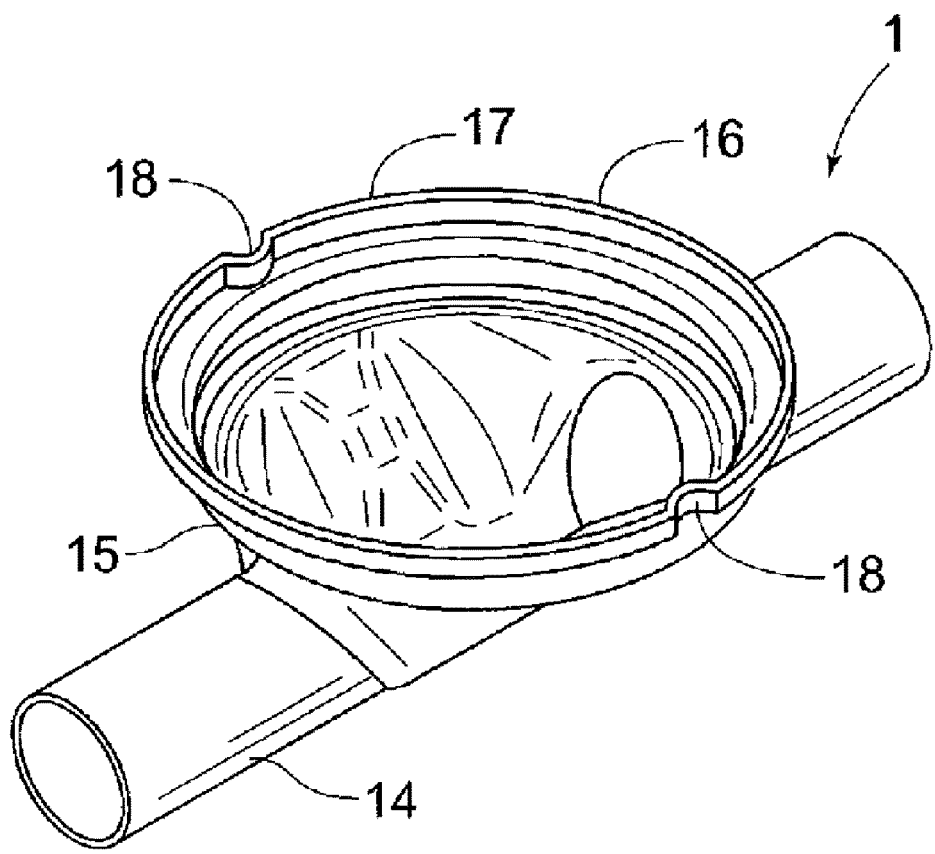
FIG. 4 It is a top perspective view of a valve body.

FIG. 4 is a top perspective view of the valve body (1).

The valve body (1) includes a flow channel (14) where fluid flows, and a main body (15) integrally provided thereon.

The main body (15) is in communication with the flow channel (14) at its lower part, and has a receiving part (16) for receiving the diaphragm (2) and the pressing member (6) at its upper part. The receiving part (16) is surrounded by a peripheral wall (17) which is circular in a planar view. The diaphragm (2), and the middle circular part (6b) and the lower circular part (6c) of the pressing member (6) are received inside the peripheral wall (17). The upper circular part (6a) of the pressing member (6) shall be placed on the receiving part (16) when assembling.

The peripheral wall (17) of the main body (15) has protrusions (18) which protrude inwardly (toward the center of the valve body).

A pair (two) of the protrusions (18) is provided at positions so as to be opposed to each other via the center of the valve body.

The protrusions (18) fit into the concave portions (13) provided at the pressing member (6). This enables the pressing member (6) to be positioned with respect to the valve body (1). As described earlier, the diaphragm (2) is positioned with respect to the pressing member (6). As a result, the diaphragm (2) is positioned with respect to the valve body (1).

In the embodiment described above (first embodiment), notches which the convex portions (12) of the pressing member (6) fit into are formed on the circumferential edge part of the diaphragm (2), and protrusions which fit into the concave portion (13) of the pressing member (6) are formed on the circumferential edge part of the valve body (1). In the present invention, the notches and the protrusions may be interchanged.

Specifically, notches which the convex portions (12) of the pressing member (6) fit into may be formed at the circumferential edge part of the valve body (1), and protrusions which fit into the concave portion (13) of the pressing member (6) may be formed at the circumferential edge part of the diaphragm (2) (the second embodiment). In this case, a pair (two) of the protrusions of the diaphragm may be preferably provided at positions so as to be opposed to each other via the center of the projection sealing part (7), and a pair (two) of notches may be preferably provided at positions so as to be opposed to each other via the center of the valve body (1).

Hereinafter, a method of assembling the diaphragm valve according to the present invention will be set forth with reference to the FIGS. 5-10. FIGS. 5-10 show the first embodiment, but the second embodiment can also be assembled by the same method.

Figure 5:
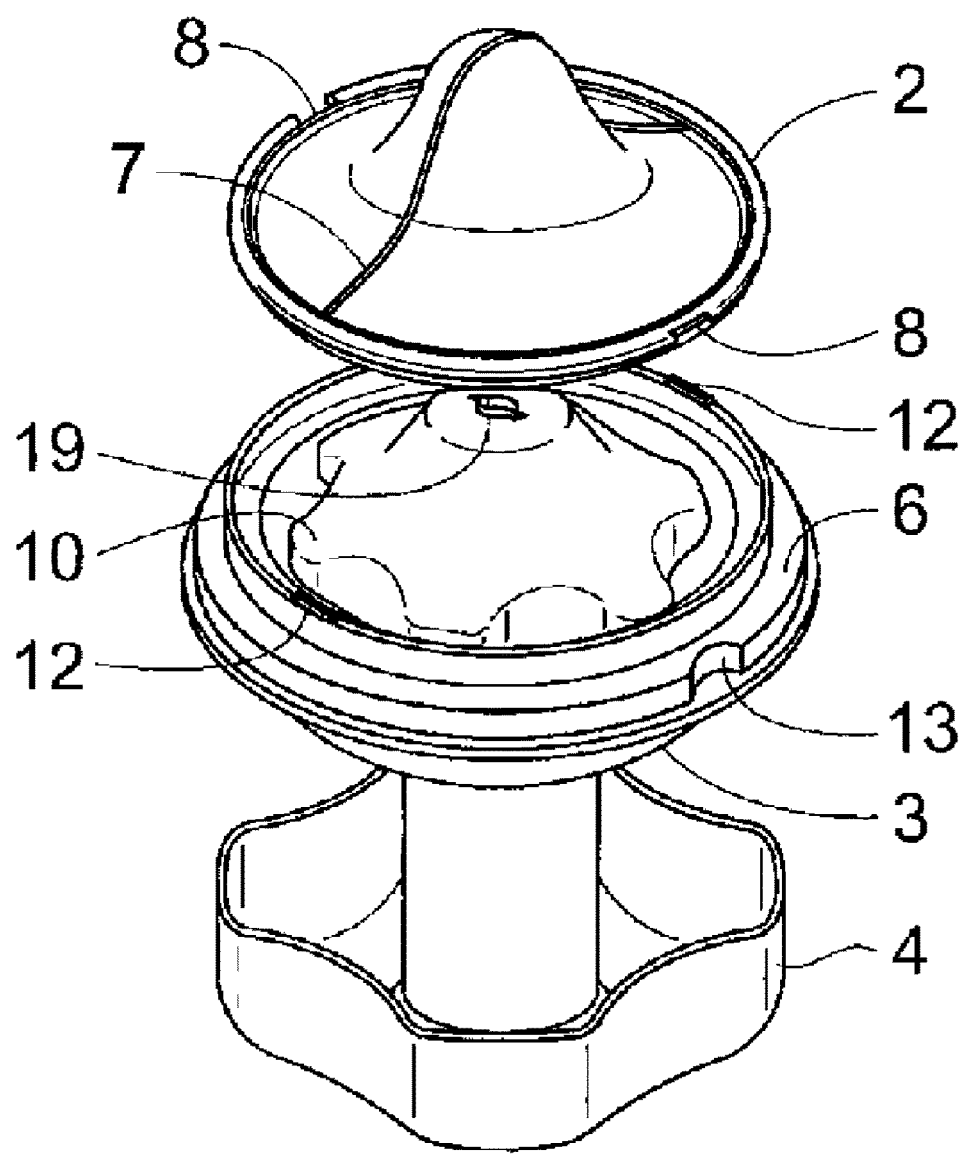
FIG. 5 It illustrates a method of assembling the diaphragm valve according to the present invention.

First, as shown in FIG. 5, the bonnet (3) with the operation mechanism (4) attached thereto is prepared. The bonnet (3) is turned upside down with the operation mechanism (4) being in a closed state (a state where the flow channel is closed). The pressing member (6) is then attached to the bonnet (3) so that it surrounds the periphery of the pressing body (a compressor) (10) fixed at the bottom end of the stem of the operation mechanism (4).

Figure 6:
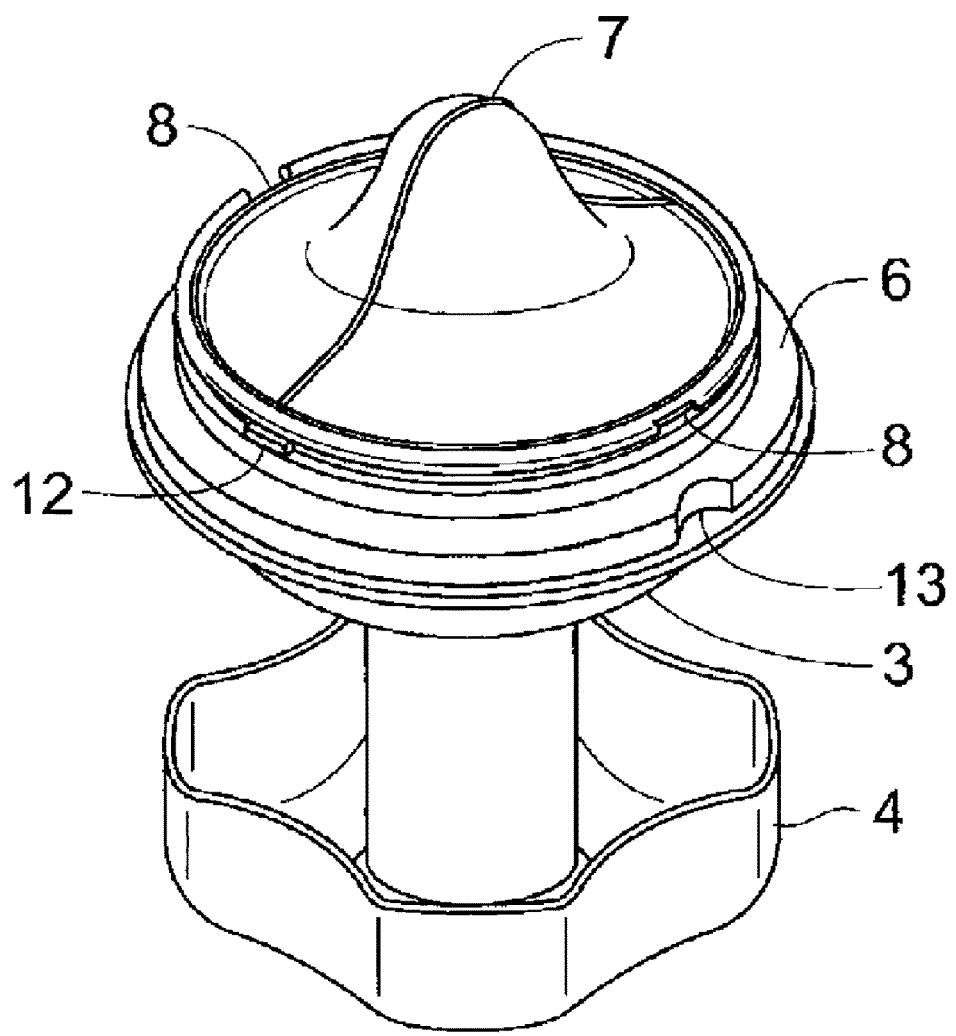
FIG. 6 It illustrates a method of assembling the diaphragm valve according to the present invention.

Next, as shown in FIG. 6, the diaphragm (2) is placed on the pressing body (10) with lightly pressed thereto. At this time, orientation of a coupling tool (a hanging fitting) previously-attached to the diaphragm (2) and orientation of a attaching hole (19) provided at the pressing body (10) are aligned (see FIG. 5), and then the coupling tool is inserted into the attaching hole (19).

Figure 7:
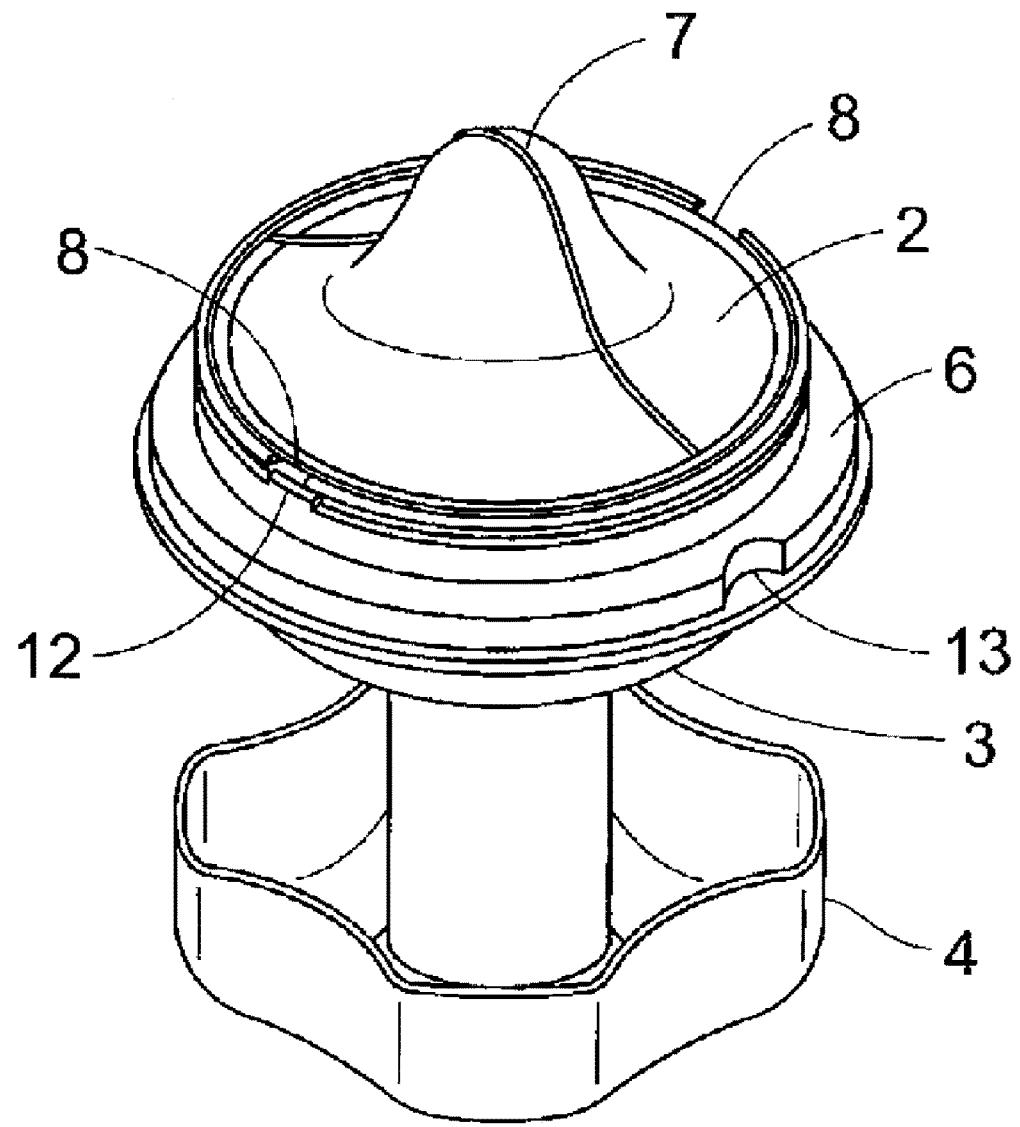
FIG. 7 It illustrates a method of assembling the diaphragm valve according to the present invention.

Then, as shown in FIG. 7, the diaphragm (2) is rotated by 90°, so that the position of the notches (8) of the diaphragm (2) and the position of the convex portions (12) of the pressing member (6) are aligned.

Figure 8:
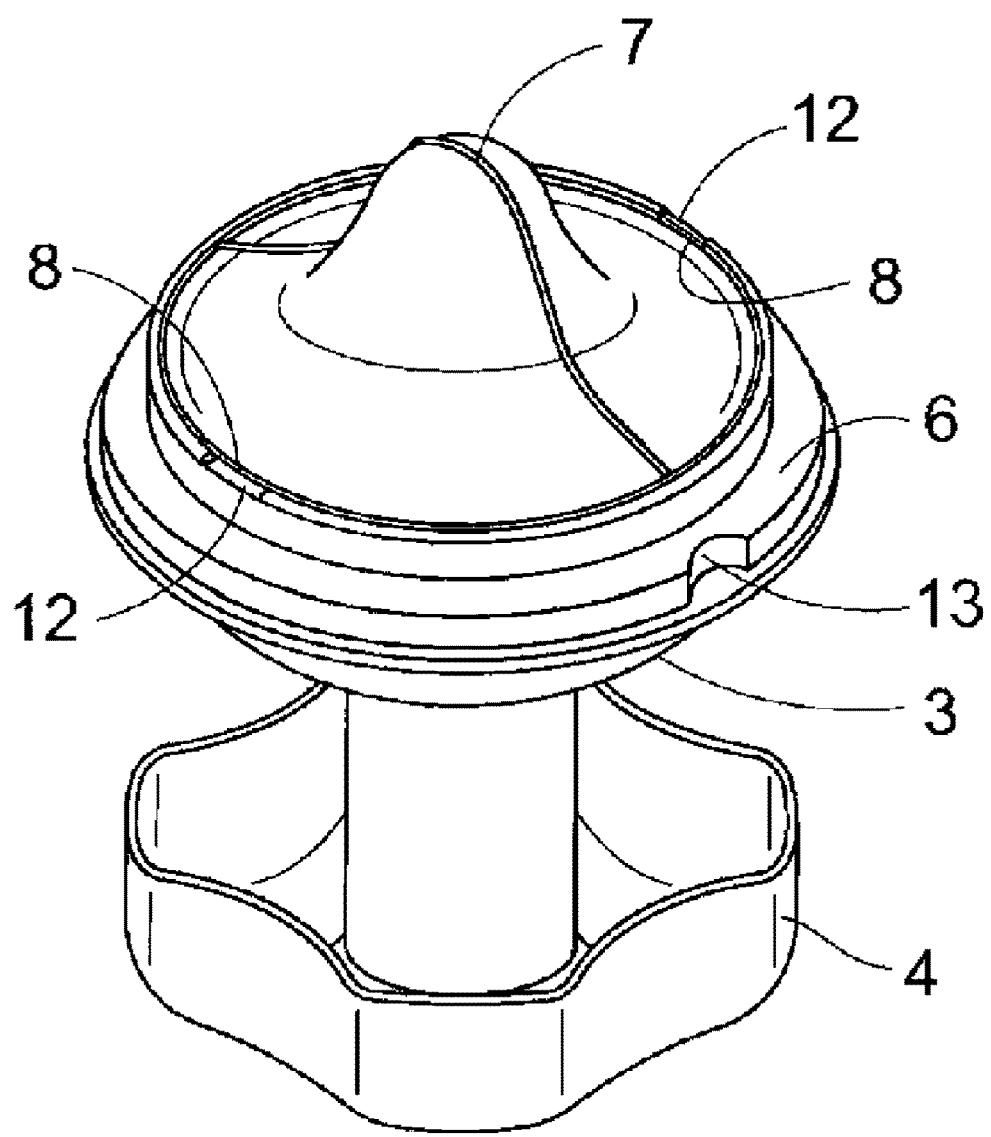
FIG. 8 It illustrates a method of assembling the diaphragm valve according to the present invention.

Then, as shown in FIG. 8, the handle (9) of the operation mechanism (4) is turned to an intermediate opening (a state where the flow channel is half-opened). Accordingly, the pressing body (10) moves up with the stem (moves down in FIG. 7 since it is arranged upside down). Therefore, the diaphragm (2) placed on the pressing body (10) moves up (moves down in FIG. 7), and the convex portions (12) of the pressing member (6) fit into the notches (8) of the diaphragm (2).

Figure 9:
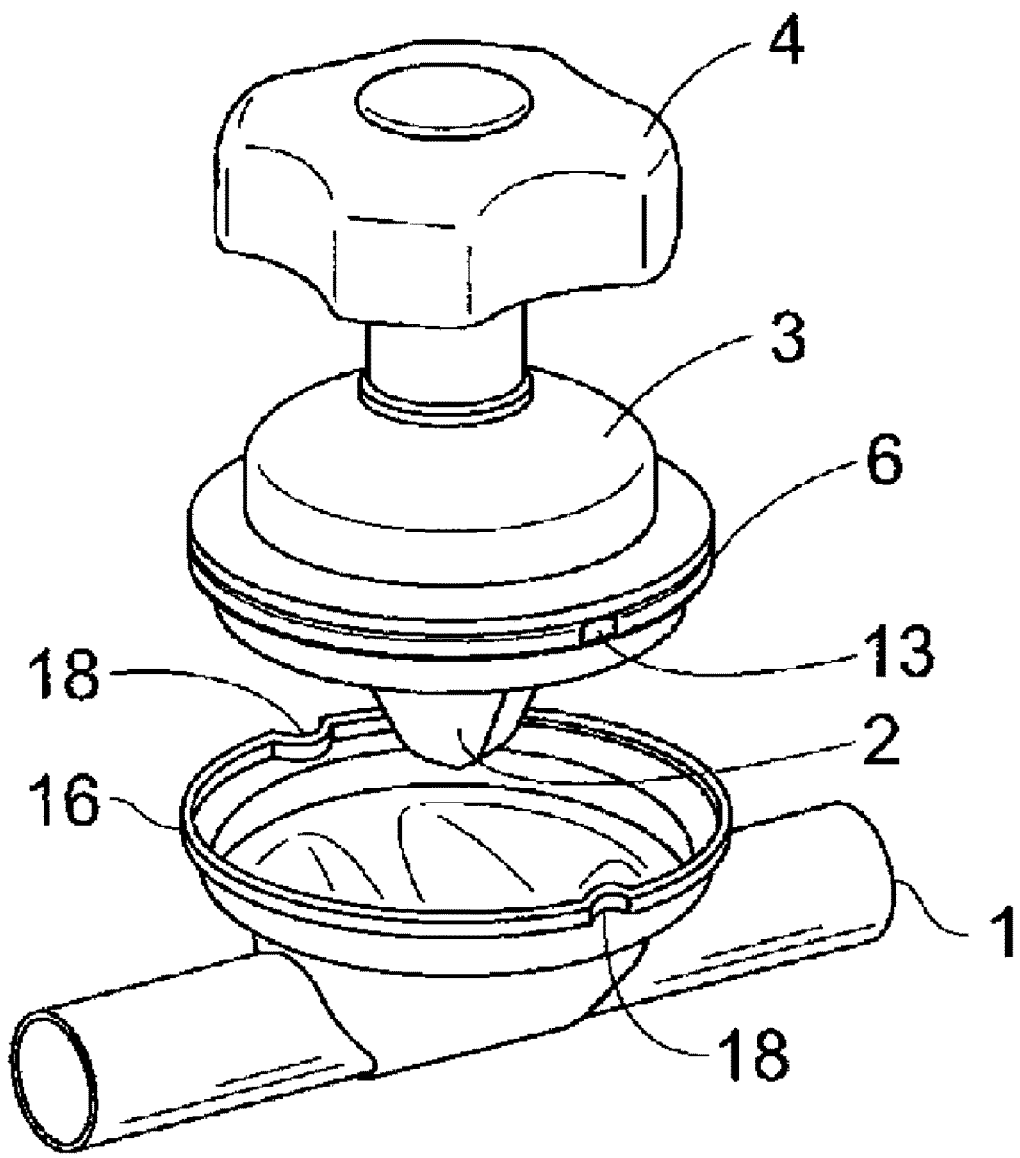
FIG. 9 It illustrates a method of assembling the diaphragm valve according to the present invention.

Then, as shown in FIG. 9, orientation of the bonnet (3) with the diaphragm (2) and the pressing member (6) attached thereto and orientation of the valve body (1) are aligned. Specifically, the positions of the protrusions (18) of the valve body (1) and the positions of the concave portions (13) of the pressing member (6) are aligned.

Figure 10:
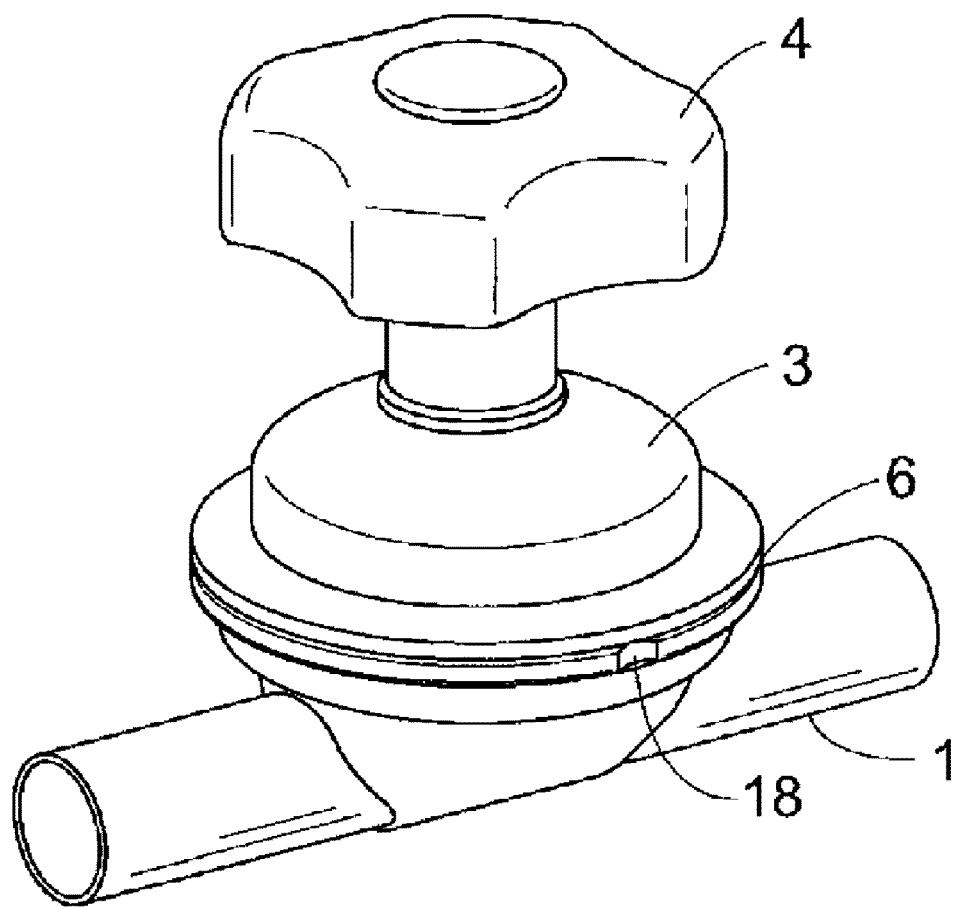
FIG. 10 It illustrates a method of assembling the diaphragm valve according to the present invention.
Figure 11:
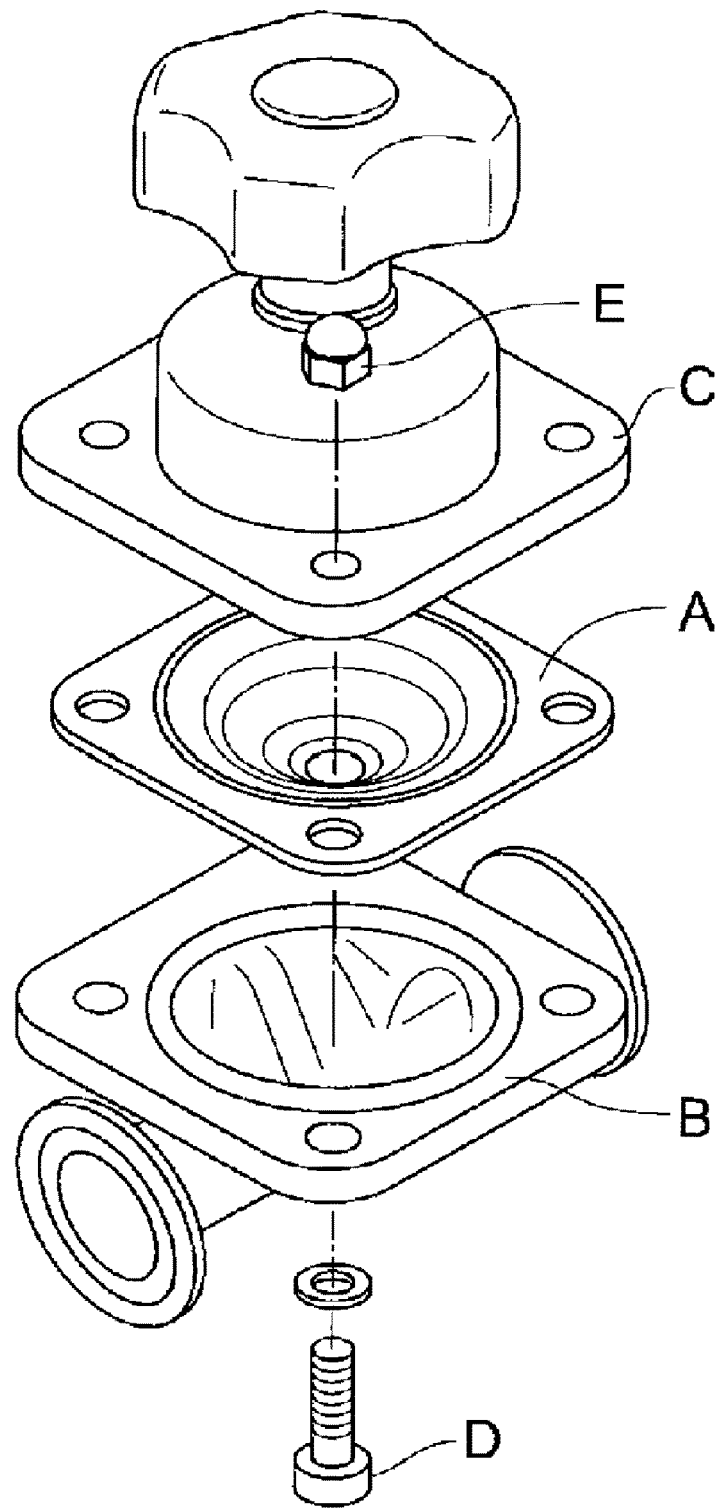
FIG. 11 It is an exploded perspective view showing an example of a conventional diaphragm valve.

Then, as shown in FIG. 10, the bonnet (3) is incorporated into the valve body (1).

Finally, the bonnet (3) and the valve body (1) are sandwiched and fixed by the clamping member (5), which completes the assembly.

As described above, it is possible to accurately position the diaphragm (2) with respect to the bonnet (3) by aligning the positions of the convex portions (12) of the pressing member (6) attached to the bonnet (3) with the positions of the notches (8) of the diaphragm (2) when the diaphragm valve of the first embodiment is assembled. When the bonnet (3) with the diaphragm (2) attached is attached to the valve body (1), they can be aligned with the use of the concave portions (13) of the pressing member (6) and the protrusions (18) of the valve body (1).

When the diaphragm valve of the second embodiment is assembled, it is possible to accurately position the diaphragm (2) with respect to the bonnet (3) by aligning the positions of the concave portions (13) of the pressing member (6) attached to the bonnet (3) with the positions (not shown) of the protrusions of the diaphragm (2). When the bonnet (3) with the diaphragm (2) attached is attached to the valve body (1), they can be aligned with the use of the convex portions (12) of the pressing member (6) and the notches (not shown) of the valve body (1).

Therefore, even when it is difficult to visually confirm a position of the diaphragm, such as when exchanging diaphragms of valves attached to a place with poor workability, it is possible to accurately position and attach the diaphragm.

INDUSTRIAL AVAILABILITY

The present invention can be widely used as a diaphragm valve for controlling circulation of fluid in pipes for such as a variety of plants.

EXPLANATION OF NUMBERS 1 valve body
2 diaphragm
3 bonnet
4 operation mechanism
5 fixing mechanism (clamping member)
6 pressing member
7 projection sealing part
8 notch
12 convex portion
13 concave portion
16 receiving part
17 peripheral wall
18 protrusion

The invention claimed is:

1. A diaphragm valve comprising:
a valve body having a flow channel where fluid flows,
a diaphragm which opens/closes said flow channel by abutting against and separating from said flow channel,
a bonnet which sandwiches a circumferential edge of said diaphragm between said bonnet and said valve body,
an operation mechanism attached to said bonnet for moving said diaphragm up and down, and
a fixing mechanism for fixing said bonnet and said valve body,
wherein said fixing mechanism comprises a clamping member for integrally sandwiching and fixing, from both right and left sides, circumferential edges of both said bonnet and said valve body,
wherein a circular pressing member for pressing said circumferential edge of said diaphragm from above is interposed between said diaphragm and said bonnet,
wherein the pressing member has convex portions and concave portions,
wherein said convex portions fit into notches provided at said circumferential edge of said diaphragm or said valve body,
wherein said concave portions are fitted by protrusions provided at said circumferential edge of said diaphragm or said valve body,
wherein a lower surface of said diaphragm includes a projection sealing part which crosses said diaphragm through the center of the diaphragm,
wherein the notches or the protrusions of said diaphragm are formed at a position such that they are opposed to each other via said projection sealing part,
wherein the convex portions and the concave portions of said pressing member are provided at a position so as to be opposed to each other via the center of the pressing member, respectively, and, the convex portions and the concave portions are provided at different positions from each other in a circumferential direction, and
wherein the circumferential edge of said diaphragm includes said notches which said convex portions fit into and the circumferential edge of said valve body includes said protrusions which fit into said concave portions.

2. The diaphragm valve according to claim 1,
wherein an upper part of said valve body includes a receiving part which receives said diaphragm or said pressing member, wherein said receiving part is surrounded by a circular peripheral wall, and wherein the protrusions of said valve body are provided so as to protrude inwardly from said peripheral wall.

3. A diaphragm valve comprising:
a valve body having a flow channel where fluid flows,
a diaphragm which opens/closes said flow channel by abutting against and separating from said flow channel,
a bonnet which sandwiches a circumferential edge of said diaphragm between said bonnet and said valve body,
an operation mechanism attached to said bonnet for moving said diaphragm up and down, and
a fixing mechanism for fixing said bonnet and said valve body,
wherein said fixing mechanism comprises a clamping member for integrally sandwiching and fixing, from both right and left sides, circumferential edges of both said bonnet and said valve body,
wherein a circular pressing member for pressing said circumferential edge of said diaphragm from above is interposed between said diaphragm and said bonnet,
wherein the pressing member has convex portions and concave portions,
wherein said convex portions fit into notches provided at said circumferential edge of said diaphragm or said valve body,
wherein said concave portions are fitted by protrusions provided at said circumferential edge of said diaphragm or said valve body,
wherein a lower surface of said diaphragm includes a projection sealing part which crosses said diaphragm through the center of the diaphragm,
wherein the notches or the protrusions of said diaphragm are formed at a position such that they are opposed to each other via said projection sealing part,
wherein the convex portions and the concave portions of said pressing member are provided at a position so as to be opposed to each other via the center of the pressing member, respectively, and, the convex portions and the concave portions are provided at different positions from each other in a circumferential direction, and
wherein the circumferential edge of said diaphragm includes said protrusions which fit into said concave portions and the circumferential edge of said valve body includes said notches which said convex portions fit into.

4. A diaphragm valve comprising:
a valve body having a flow channel where fluid flows,
a diaphragm which opens/closes said flow channel by abutting against and separating from said flow channel,
a bonnet which sandwiches a circumferential edge of said diaphragm between said bonnet and said valve body,
an operation mechanism attached to said bonnet for moving said diaphragm up and down, and
a fixing mechanism for fixing said bonnet and said valve body,
wherein said fixing mechanism comprises a clamping member for integrally sandwiching and fixing, from both right and left sides, circumferential edges of both said bonnet and said valve body,
wherein a circular pressing member for pressing said circumferential edge of said diaphragm from above is interposed between said diaphragm and said bonnet,
wherein the pressing member has convex portions and concave portions,
wherein said convex portions fit into notches provided at said circumferential edge of said diaphragm or said valve body,
wherein said concave portions are fitted by protrusions provided at said circumferential edge of said diaphragm or said valve body,
wherein a lower surface of said diaphragm includes a projection sealing part which crosses said diaphragm through the center of the diaphragm,
wherein the notches or the protrusions of said diaphragm are formed at a position such that they are opposed to each other via said projection sealing part, and
wherein the circumferential edge of said diaphragm includes said notches which said convex portions fit into and the circumferential edge of said valve body includes said protrusions which fit into said concave portions.

5. The diaphragm valve according to claim 4,
wherein an upper part of said valve body includes a receiving part which receives said diaphragm or said pressing member, wherein said receiving part is surrounded by a circular peripheral wall, and wherein the protrusions of said valve body are provided so as to protrude inwardly from said peripheral wall.

6. A diaphragm valve comprising:
a valve body having a flow channel where fluid flows,
a diaphragm which opens/closes said flow channel by abutting against and separating from said flow channel,
a bonnet which sandwiches a circumferential edge of said diaphragm between said bonnet and said valve body,
an operation mechanism attached to said bonnet for moving said diaphragm up and down, and
a fixing mechanism for fixing said bonnet and said valve body,
wherein said fixing mechanism comprises a clamping member for integrally sandwiching and fixing, from both right and left sides, circumferential edges of both said bonnet and said valve body,
wherein a circular pressing member for pressing said circumferential edge of said diaphragm from above is interposed between said diaphragm and said bonnet,
wherein the pressing member has convex portions and concave portions,
wherein said convex portions fit into notches provided at said circumferential edge of said diaphragm or said valve body,
wherein said concave portions are fitted by protrusions provided at said circumferential edge of said diaphragm or said valve body,
wherein a lower surface of said diaphragm includes a projection sealing part which crosses said diaphragm through the center of the diaphragm,
wherein the notches or the protrusions of said diaphragm are formed at a position such that they are opposed to each other via said projection sealing part, and
wherein the circumferential edge of said diaphragm includes said protrusions which fit into said concave portions and the circumferential edge of said valve body includes said notches which said convex portions fit into.

7. A diaphragm valve comprising:
a valve body having a flow channel where fluid flows, a diaphragm which opens/closes said flow channel by abutting against and separating from said flow channel, a bonnet which sandwiches a circumferential edge of said diaphragm between said bonnet and said valve body, an operation mechanism attached to said bonnet for moving said diaphragm up and down, and a fixing mechanism for fixing said bonnet and said valve body, wherein said fixing mechanism comprises a clamping member for integrally sandwiching and fixing, from both right and left sides, circumferential edges of both said bonnet and said valve body, wherein a circular pressing member for pressing said circumferential edge of said diaphragm from above is interposed between said diaphragm and said bonnet, wherein the pressing member has convex portions and concave portions, wherein said convex portions fit into notches provided at said circumferential edge of said diaphragm or said valve body, wherein said concave portions are fitted by protrusions provided at said circumferential edge of said diaphragm or said valve body, and wherein the circumferential edge of said diaphragm includes said notches which said convex portions fit into and the circumferential edge of said valve body includes said protrusions which fit into said concave portions.

8. The diaphragm valve according to claim 7, wherein an upper part of said valve body includes a receiving part which receives said diaphragm or said pressing member, wherein said receiving part is surrounded by a circular peripheral wall, and wherein the protrusions of said valve body are provided so as to protrude inwardly from said peripheral wall.

9. A diaphragm valve comprising:

a valve body having a flow channel where fluid flows, a diaphragm which opens/closes said flow channel by abutting against and separating from said flow channel, a bonnet which sandwiches a circumferential edge of said diaphragm between said bonnet and said valve body, an operation mechanism attached to said bonnet for moving said diaphragm up and down, and a fixing mechanism for fixing said bonnet and said valve body, wherein said fixing mechanism comprises a clamping member for integrally sandwiching and fixing, from both right and left sides, circumferential edges of both said bonnet and said valve body, wherein a circular pressing member for pressing said circumferential edge of said diaphragm from above is interposed between said diaphragm and said bonnet, wherein the pressing member has convex portions and concave portions, wherein said convex portions fit into notches provided at said circumferential edge of said diaphragm or said valve body, wherein said concave portions are fitted by protrusions provided at said circumferential edge of said diaphragm or said valve body, and wherein the circumferential edge of said diaphragm includes said protrusions which fit into said concave portions and the circumferential edge of said valve body includes said notches which said convex portions fit into.

* * * * *